Aug. 19, 1958   A. C. SAMPIETRO   2,847,981
VALVE ROTATING DEVICE
Filed Oct. 22, 1954   3 Sheets-Sheet 1
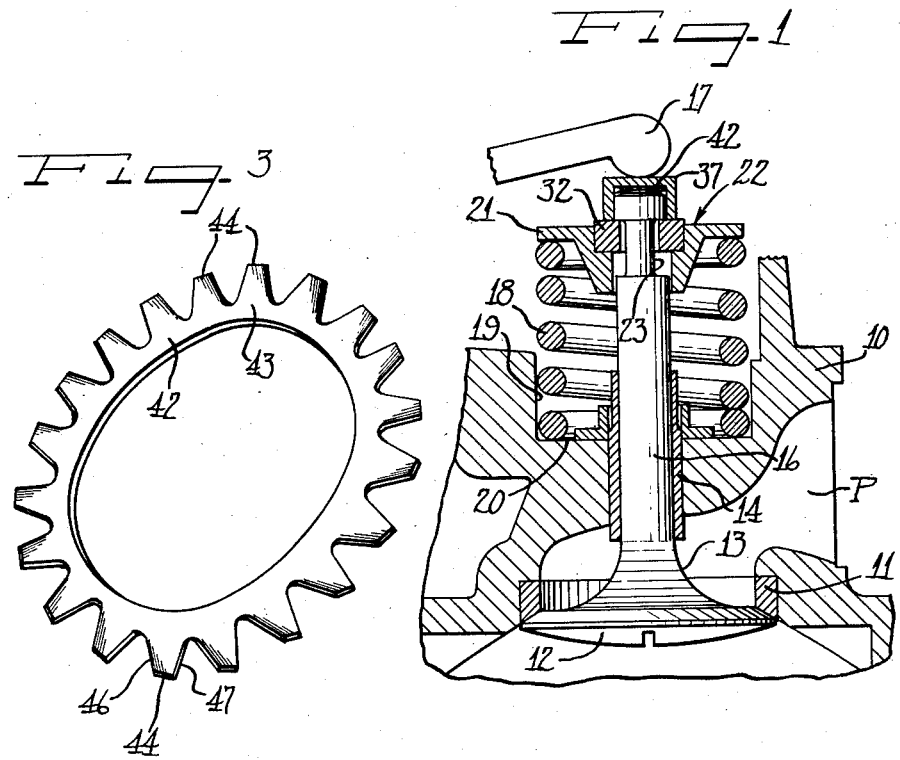
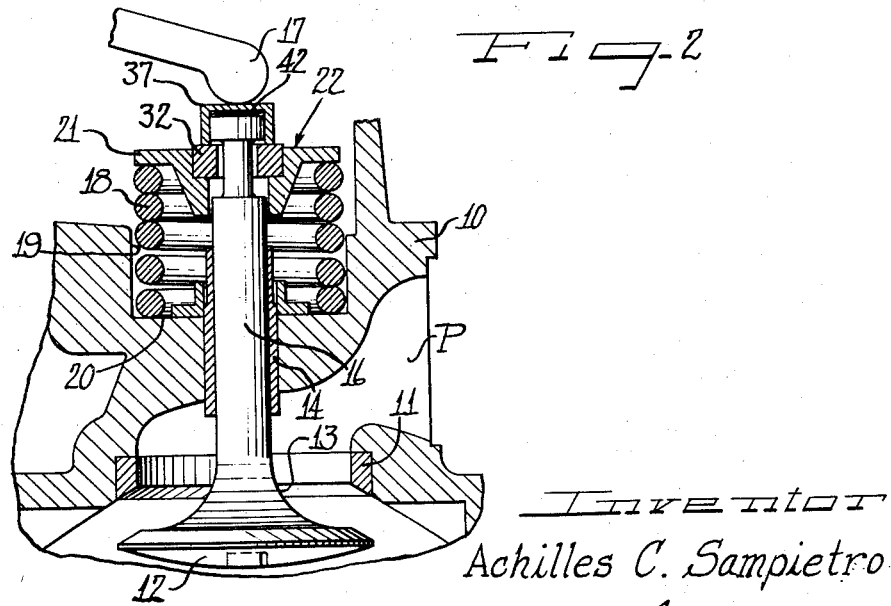
Inventor
Achilles C. Sampietro Aug. 19, 1958   A. C. SAMPIETRO   2,847,981
VALVE ROTATING DEVICE
Filed Oct. 22, 1954   3 Sheets-Sheet 2
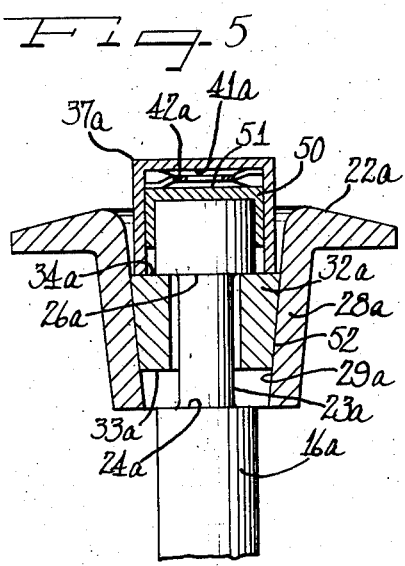
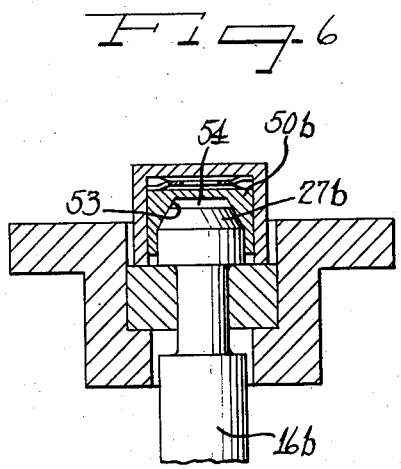
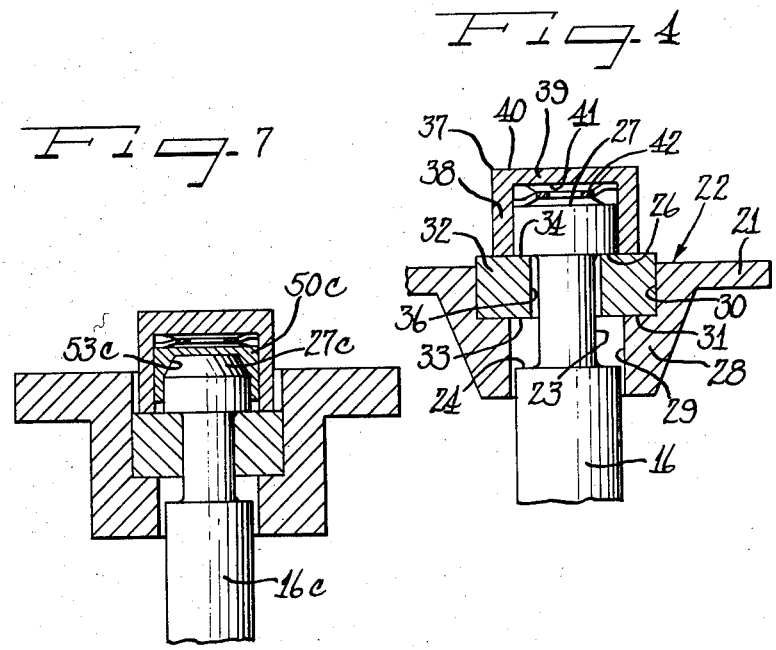
Inventor
Achilles C. Sampietro

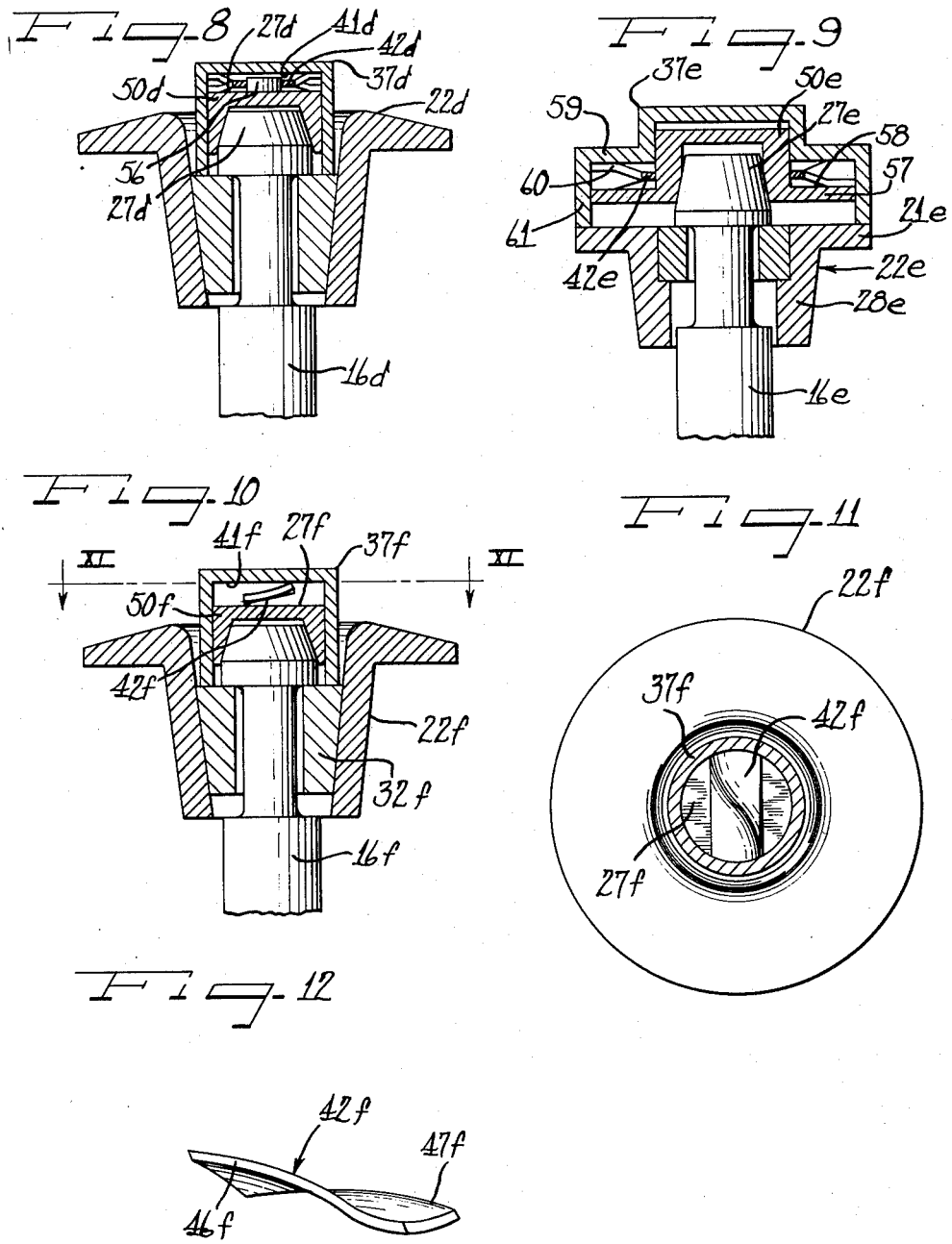

United States Patent Office 2,847,981
Patented Aug. 19, 1958

2,847,981

VALVE ROTATING DEVICE

Achilles C. Sampietro, Ann Arbor, Mich., assignor to Thompson Products, Inc., Cleveland, Ohio, a corporation of Ohio Application October 22, 1954, Serial No. 464,011

20 Claims. (Cl. 123—90)

This invention relates generally to a device for effecting relative rotation between axially adjacent parts and more particularly relates to an improved form of valve rotating device for a spring-loaded poppet valve whereby the valve may be successively angularly shifted during the cyclical operation thereof.

The benefits of successive angular shifting of a spring-loaded poppet valve during the cyclical operation thereof are well recognized since such rotation effects an even wearing between the valve head and the valve seat, prevents interfering carbon deposits, minimizes valve distortion, and materially improves the operating efficiency of the valve.

The present invention is directed to a particularly simple form of valve rotating device which minimizes the number of parts required to effect successive rotation of a valve during the cyclical operation thereof.

According to the principles of the present invention, relatively rotatable axially separable inner and outer parts are provided which have confronting surfaces between which is inserted a washer means having torsionally twisted edge portions to rotatively drive the parts when compressed.

In one form of the invention, the inner and outer parts conveniently take the form of a valve spring seating cap means and the valve stem of a poppet valve. The washer means may comprise either a so-called "star" washer having a plurality of circumferentially spaced peripheral prongs, each prong being torsionally twisted to provide the torsionally twisted edge portions or the washer means may comprise a strip form member preferably made of spring metal torsionally twisted to provide edge portions for the purposes set forth.

The specific shape of the valve cap means and the end of the valve stem may be varied within wide limits in order to maximize the area of the confronting surfaces and hence the size and characteristics of the washer means. It may be noted that the present invention further contemplates the provision of a stop projection formed on one of the confronting surfaces so that the maximum compression of the washer means will be within prescribed limits.

It is an object of the present invention, therefore, to provide a rotating device for relatively rotatable parts consisting of a minimum number of elements of simplified form.

Another object of the present invention is to provide a valve rotating device which effectively utilizes washer means providing torsionally twisted edge portions to rotatively drive valve parts under increased spring-loading.

A further object of the present invention is to provide a new use for a lock washer, namely, the use of the washer as a valve rotating device.

Yet another object of the present invention is to provide a method of valve rotation which utilizes the steps of translating an increased axial compression force into a rotational movement by means of a torsionally twisted washer means.

Many other features, advantages and additional objects of the present invention will become manifest to those versed in the art upon making reference to the detailed description which follows and the accompanying sheets of drawings in which preferred structural forms of valve rotating devices incorporating the principles of the present invention are illustrated by way of example.

On the drawings:

Figure 1 is a cross-sectional view with parts shown in elevation illustrating a valve assembly in an engine part and incorporating a valve rotating device in accordance with the principles of the present invention;

Figure 2 is a view similar to Figure 1 but illustrating the valve components in an open position, the relatively rotatable parts having been angularly shifted;

Figure 3 is an enlarged isometric view of a washer means provided in accordance with the principles of the present invention;

Figure 4 is an enlarged fragmentary cross-sectional view with parts shown in elevation illustrating additional details of construction of the valve rotating device incorporated in the valve assembly of Figures 1 and 2;

Figures 5, 6 and 7 are views similar to Figure 4 but illustrating alternative embodiments of cap connecting means whereby the area of the confronting surfaces may be maximized;

Figure 8 is a view generally similar to the embodiments shown in Figures 4–7 but showing specifically the provision of a stop projection formed on one of the confronting surfaces to limit the maximum compression of the washer means;

Figure 9 is an alternative embodiment which illustrates a form of the invention wherein a larger washer means may be employed to increase the turning moment imparted to the valve while decreasing the velocity of rotation;

Figure 10 shows a valve rotating device according to the principles of the present invention utilizing a different form of washer means;

Figure 11 is a cross-sectional view taken generally on line XI—XI of Figure 10; and Figure 12 is an isometric view of the washer means illustrated in the embodiment of Figures 10 and 11.

As shown on the drawings:

Although the principles of the present invention are generally applicable to any rotating device required between relatively rotatable parts, a particularly useful application of the principles of the present invention is made in connection with a valve rotating device for the poppet valve assembly of an internal combustion engine. As applied to such an environment, an engine part is indicated at 10 having a port P in which is received a valve seat insert 11 seating a head 12 of a valve 13 provided to control the flow of fluid through the port P.

The engine part 10 has an opening receiving a valve stem guide 14 in which is reciprocably supported a valve stem 16.

Means for actuating the valve are indicated at 17 conventionally located at the end of the valve stem 16.

In order to normally bias the valve 13 closed, a coil type valve spring 18 is provided. One end of the coils of the coil spring 18 is received within a recess 19 formed in the engine part 10 and bottomed against a wall 20. The other end of the coil spring 18 is bottomed against a radially outwardly extending flange 21 formed on a spring seating valve retainer cap means indicated generally by the reference numeral 22.

In the form of the invention illustrated in Figures 1, 2 and 4, the valve stem 16 is provided with an annular peripheral recess 23 bounded at opposite ends by a first radial shoulder 24 and a second radial shoulder 26. The end extremity of the valve stem 16 is provided by a flat surface 27.

In this form of the invention, the valve cap means 22 includes a body portion 28 having a bore 29 extending therethrough which is of larger diameter than the stem 16 thereby to freely pass the stem 16. The bore 29 is counter-bored as at 30, a radial shoulder 31 being formed between the bore 29 and the counter-bore 30.

Received within the counter-bore 30 and abutting against the shoulder 31 is a locking means 32 conveniently comprising a lock ring received within the recess 23 and having flat faces 33 and 34 which are spaced apart a lesser dimension than the spacing dimension between the shoulders 24 and 26. The lock ring 32 is provided with a central opening 36 which is of greater diameter than the thickness of the valve stem at the locale of the recess 23 so as to freely pass the valve stem. Accordingly, the cap means 22 forms an outer part and the valve stem 16 forms an inner part, the inner and outer parts being axially separable within the limits of axial movement prescribed by the interlock effected between the locking means 32 and the shoulders 24 and 26 at the ends of the recess 23 formed on the valve stem 16.

In accordance with the principles of the present invention, the valve cap means 22 further includes an inverted cup-shaped member 37 which spans the end of the valve stem 16. In the form of the invention illustrated in Figures 1, 2 and 4, the cup-shaped member 37 has side wall portions 38 which circumscribe the end of the valve stem 16 and which engage against the lock ring 32. The cup-shaped member 37 further includes a bottom wall 39 having an outer face 40 forming an engagement surface for cooperating with the valve actuating means 17 and an inner face 41 which forms a radially extending surface confronting the flat surface 27 on the end of the valve stem 16.

Interposed between the confronting surfaces 27 and 41 is a washer means 42 having torsionally twisted edge portions normally engaging the surfaces 27 and 41 and operative to impart a turning moment therebetween when subjected to compression.

As is clearly illustrated in Figure 3, the washer means 42 may conveniently comprise a so-called "star" washer made of spring metal. In the embodiment of Figure 3, the "star" washer is generally annular in configuration including a ring-like body portion 43 and particularly characterized by a serrated peripheral edge forming a plurality of circumferentially spaced fingers or prongs 44. Each of the fingers or prongs 44 is torsionally twisted so that the spaced apart edge portions of each respective prong are relatively axially spaced apart from one another as well as laterally spaced apart from one another. It will be appreciated, however, that the lateral spacing dimension between a pair of respective edges, for example, the edges indicated on Figure 3 at 46 and 47 respectively on a single representative prong is a greater dimension when the washer means 42 is initially formed than after twisting of the prong 44 to space the respective edges 46 and 47 in axial direction. For that reason, any compression of the washer means 44 tending to flatten out the torsionally twisted fingers or prongs 44 will also tend to increase the lateral spacing dimension of the edges 46 and 47 of each representative prong so that a turning moment will be exerted between confronting adjacent surfaces engaged against the respective edges 46 and 47.

In Figure 1, the valve is in closed position or on the closing portion of the cycle. In Figure 2, the valve is in open position or the opening portion of the cycle.

When the valve 13 is open, the washer means 42 is free between the surface 27 at the tip of the valve stem 16 and the surface 41 provided by the valve cap means 22 and more specifically the cup-shaped member 37. When the valve 13 is opening, the washer means 42 is compressed, and a twist is set up in the fingers or prongs 44. As the cup-shaped member 37 is forced against the other components of the cap means 22 and the valve 13 is free, the valve rotates and the cap means 22 remains stationary. A reverse action will occur when the valve closes. It will be appreciated that the locking means between the valve stem 16 and the retainer cap means 22 are so related that the valve stem 16 is free in the opening part of the cycle.

To maximize the area of the confronting surface provided on the end of the valve stem, additional cap means may be fitted on the valve tip. This objective may be accomplished in several ways. In Figure 5 a valve stem 16a has a cap member 50 which may be force fit over the end of the valve stem 16a thereby to provide an abutment surface 51 for the purposes set forth.

In the form of the invention illustrated in Figure 5, the valve cap retaining means is indicated at 22a and includes a body portion 28a having a tapered bore 29a. The lock ring 32a has a correspondingly tapered peripheral surface 52 and includes end faces 33a and 34a adapted to engage respectively the shoulders 24a and 26a at the ends of a recess 23a formed in the valve stem 16a. The embodiment of Figure 5 further includes a washer means 42a and a cup-shaped member 37a which provides the other confronting surface 41a for the purposes set forth.

In the embodiment of Figure 6 the parts are generally similar structurally and functionally, however, a valve stem 16b is shown with an end portion formed as a cone 27b. A cap member 50b has a correspondingly shaped conical inner surface to effect attachment with the valve stem 16b. The inner conical surface is indicated at 53 and in the embodiment of Figure 6 is of greater extent than the correspondingly conical surface 27b on the valve stem 16b. Accordingly, a space 54 may be provided between the extremity of the valve stem 16b and the end wall of the cap 50b.

In the embodiment of Figure 7, a cap is shown at 50c and a valve stem 16c has a conically tapered end portion 27c. The cap 50c is provided with an internal recess having conically tapered walls 53c corresponding to the conically shaped end portion 27c of the valve stem 16c and the end of the valve stem 16c engages against the end wall of the cap 50c.

In Figure 8, a valve stem 16d has associated therewith a valve cap retainer means 22d which includes a cup-shaped member 37d providing a first confronting surface 41d engaged by a washer means 42d. The end of the valve stem 16d is conically tapered as at 27d and a cap member 50d is fitted on the end of the valve stem 16d to provide a second confronting surface 27d which also engages the washer means 42d.

In this form of the invention, one of the confronting surfaces 41d or 27d is provided with a distance piece to limit the maximum compression of the washer means 42d. As shown in Figure 8, a stop or abutment 56 projects upwardly from the surface 27d on the cap 50d and extends through the central opening of the washer means 42d into closely spaced relation relative to the surface 41d.

By limiting the maximum compression of the washer means 42d, the twist imparted to the valve at high speeds will also be limited, thereby increasing the life of the washer means 42d.

In Figure 9, an alternative embodiment is shown wherein a larger washer means may be employed to increase the turning moment imparted to the valve, thereby to decrease the velocity of rotation. In Figure 9 is illustrated a valve stem 16e having an end portion provided with a conical taper as at 27e and receiving a cap member 50e particularly characterized by the formation thereon of a radially outwardly extending flange 57. The upper surface of the flange 57 as indicated at 58 provides one of the confronting surfaces characteristic of the present invention.

As shown in Figure 9, the cup-shaped member of this embodiment is indicated at 37e and includes a radially outwardly extending medial flange or wall 59 forming a surface 60 which confronts the surface 58. Depending from the flange or wall 59 and circumscribing thereby is an annular wall 61 which engages directly against the flange 21e formed on the valve cap retainer means indicated generally at 22e and including the body portion 28e.

Interposed between the annular confronting surfaces 58 and 60 is a washer means 42e. Because the confronting surfaces 60 and 58 are of annular configuration and are considerably outwardly spaced relative to the axis of the valve stem 16e, it will be appreciated that the washer means 42e can be made of much larger diameter than the washer means previously described and, accordingly, the larger washer means 42e will increase the turning moment imparted to the valve and will decrease the velocity of rotation.

The embodiment of Figures 10, 11 and 12 shows how a different form of washer means may be employed. In this disclosure, the term "washer means" is used in a generic sense and is not intended to be restricted to an element of annular form or of ring form. This will become more evident upon noting the structural characteristics of the washer means provided in the embodiment of Figures 10, 11 and 12.

Referring first of all to Figure 10, a valve stem is indicated at 16f and the valve cap means is indicated at 22f. The locking means is indicated at 32f. The confronting surfaces characteristic of the present invention are provided at 41f by the cup-shaped member 37f and at 27f by the cap member 50f connected to the conical end of the valve stem 16f.

Interposed between the confronting surfaces 41f and 27f is a washer means 42f. As will be noted upon referring to Figures 10, 11 and 12, the washer means 42f takes the form of a piece of flat spring steel torsionally twisted to provide a single prong or finger having edge portions 46f and 47f which are not only relatively axially spaced but also relatively laterally spaced. Accordingly, the single strip of metal exhibits such characteristics that any tendency to flatten out the torsionally twisted element will produce a turning moment between the confronting surfaces 41f and 27f.

Although various minor modifications might be suggested by those versed in the art, it should be understood that I wish to embody within the scope of the patent warranted hereon all such modifications as reasonably and properly come within the scope of my contribution to the art.

I claim as my invention:

1. A valve rotating device for a spring-loaded stemmed valve comprising a spring seating valve cap means, locking means to retain said valve cap means on the end of the valve stem and a flat driving member having a torsionally twisted edge providing a plurality of prongs, each of said prongs being twisted an appreciable extent in a direction axial of the driving member, said washer being inserted between said valve stem and said valve cap and relatively displacing the stem and the cap in angular direction when compressed.

2. In combination, linearly reciprocable and angularly rotatable parts having confronting axially adjacent surfaces, and driving means being torsionally twisted to provide axially separated edge portions for engaging both of said surfaces and for exerting a torsional turning force to said parts when compressed between said surfaces.

3. A valve rotating device comprising a spring seating valve cap, means providing a valve stem, said stem and cap comprising relatively rotatable parts having spaced apart axially adjacent confronting surfaces, and driving means having torsionally twisted edge portions engaging said surfaces to rotatably drive said parts when compressed.

4. In combination, an engine part having a port formed therein, a valve having a head seated in said port and a valve stem reciprocably supported in said engine part, a coiled valve spring bottomed at one end against said engine part and surrounding said stem, a valve cap means engaging the other end of said spring, the end of said stem having an annular recess formed therein to provide shoulders spaced apart along the length of the axis of the valve, locking means engaging the valve cap means and received in said annular recess to engage with said shoulders, thereby to limit the relative axial movement of said valve cap means and said valve stem, said valve cap means and said stem having confronting surfaces separable axially within the limits of axial movement prescribed by said locking means, and driving means inserted between said surfaces having torsionally twisted edge portions, said surfaces being moved towards one another under increased axial loading of said valve to compress said washer means, thereby to rotate said valve.

5. A rotating device comprising relatively rotatable axially separable inner and outer parts, locking means between the parts prescribing the limits of relative axial separation of the parts, confronting surfaces on the parts axially separable within said prescribed limits, and driving means inserted between said surfaces having torsionally twisted edge portions rotatively driving the parts when compressed.

6. A rotating device as defined in claim 5, said outer part comprising a valve spring seating cap means and said inner part comprising a valve stem means.

7. A rotating device as defined in claim 6, said valve spring seating cap means including a tapered body portion having an annular peripheral flange for bottoming a coiled valve spring, said locking means comprising a correspondingly tapered locking member concurrently received in said tapered body portion and in an annular recess formed in said stem means.

8. A rotating device as defined in claim 6, said cap means further including an inverted cup-shaped member having the side wall portions thereof engaging said locking means and an end wall portion thereof providing one of said surfaces.

9. A rotating device as defined in claim 8, said valve stem means including a cap fitting over the end of said stem means and forming the other of said surfaces.

10. A rotating device as defined in claim 9, the cap and the end of said valve stem means having complementary conically tapered engaging surfaces.

11. A rotating device as defined in claim 8, the other of said surfaces being formed on the end of said valve stem means.

12. A rotating device as defined in claim 6, said cap means further including a cover member spanning the end of said valve stem means and providing on one face a surface for engaging a valve actuator means and providing on its opposite face one of said confronting surfaces.

13. A rotating device as defined in claim 5, said driving means comprising an annular washer having a plurality of circumferentially spaced peripheral prongs, each prong being torsionally twisted to provide said edge portions.

14. A rotating device as defined in claim 5, said driving means comprising a strip form member torsionally twisted to provide said edge portions.

15. A rotating device as defined in claim 5, one of said surfaces having a stop projection formed thereon to limit the maximum compression of the driving means.

16. The use of a washer means having torsionally twisted axially separated edge portions as a valve rotating device which includes the steps of compressing the washer means between confronting radial surfaces of relatively rotatable parts.

17. In a rotating device, a washer means having torsionally twisted axially separated edges spaced from one another laterally and longitudinally and relatively rotatable parts having confronting surfaces engaged by said edges, said parts being rotatably driven upon applying compressive forces to said washer means longitudinally.

18. In combination, rotatable inner and outer parts having confronting surfaces, and a driving means inserted between said surfaces and having laterally spaced apart edges twisted torsionally into longitudinally spaced relation, thereby to concurrently engage both of said surfaces, compression of said driving means tending to flatten out said driving means and producing a turning moment on said parts.

19. A means of successively incrementally rotating inner and outer parts having confronting radial surfaces which includes the means loading said parts axially with a minimum amount of force to move said radial surfaces toward one another axially, means separating said parts axially and including means providing torsionally twisted edge portions spaced apart laterally and longitudinally and means for cyclically increasing the amount of axial force on said parts in an amount greater than said minimum tending to flatten out said torsionally twisted edge portions, thereby to impart a turning moment between the parts.

20. A rotating device comprising inner and outer rotatable parts having confronting radial surfaces, and means between and engaging said surfaces providing torsionally twisted edges spaced apart laterally and longitudinally, and rotatively driving said parts when compressed between the parts tending to flatten out said edges.

References Cited in the file of this patent

UNITED STATES PATENTS

| | | | |
|---|---|---|---|
| 1,462,160 | Anthony | July 17, | 1923 |
| 2,165,238 | Douglas et al. | July 11, | 1939 |
| 2,165,239 | Douglas et al. | July 11, | 1939 |
| 2,366,869 | Olson | Jan. 9, | 1945 |
| 2,557,288 | Hosking | June 19, | 1951 |
| 2,647,501 | Rich | Aug. 4, | 1953 |
| 2,653,587 | Rasmussen et al. | Sept. 29, | 1953 |
| 2,666,468 | Poupitch | Jan. 19, | 1954 |
| 2,731,057 | Poupitch | Jan. 17, | 1956 |